(12) United States Patent
Doshev et al.

(10) Patent No.: US 8,541,507 B2
(45) Date of Patent: Sep. 24, 2013

(54) HIGH FLOW POLYPROPYLENE COMPOSITION

(75) Inventors: Petar Doshev, Linz (AT); Pirjo Jaaskelainen, Porvoo (FI); Saeid Kheirandish, Linz (AT); Pauli Leskinen, Helsinki (FI); Geir Kristian Johnsen, Abu Dhabi (AE); Hao Ding, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 13/144,522

(22) PCT Filed: Jun. 30, 2010

(86) PCT No.: PCT/EP2010/003955
§ 371 (c)(1),
(2), (4) Date: Oct. 4, 2011

(87) PCT Pub. No.: WO2011/000557
PCT Pub. Date: Jan. 6, 2011

(65) Prior Publication Data
US 2012/0015170 A1    Jan. 19, 2012

(30) Foreign Application Priority Data
Jul. 1, 2009   (EP) ..................... 09008624

(51) Int. Cl.
*C08F 8/00*   (2006.01)
*C08L 23/10*  (2006.01)

(52) U.S. Cl.
USPC ........................................... 525/191

(58) Field of Classification Search
USPC ................................ 525/191, 240
See application file for complete search history.

(56) References Cited

U.S. PATENT DOCUMENTS 6,723,795 B1 *   4/2004   Dupire et al. .................. 525/240

FOREIGN PATENT DOCUMENTS

| EP | 0 591 224 | 2/1998 |
|----|-----------|--------|
| EP | 1 028 984 | 7/2001 |
| EP | 1 183 307 | 7/2005 |
| EP | 1 873 173 | 1/2008 |
| EP | 2 014 714 | 1/2009 |
| WO | WO 99/24479 | 5/1999 |
| WO | WO 99/24501 | 5/1999 |

OTHER PUBLICATIONS

Gahleitner, Markus et al., article titled "*Propylene-Ethylene Random Copolymers: Comonomer Effects of Crystallinity and Application Properties*", Journal of Applied Polymer Science, vol. 95, 1073-1081 (2005).
International Search Report mailed Aug. 17, 2010 for International application No. PCT/EP2010/003955.
Written Opinion mailed Aug. 17, 2010 for International application No. PCT/EP2010/003955.
Response to Written Opinion dated Apr. 19, 2011 for International application No. PCT/EP2010/003955.

* cited by examiner

*Primary Examiner* — Nathan M Nutter
(74) *Attorney, Agent, or Firm* — Fay Sharpe LLP

(57) ABSTRACT

The present invention relates to a high flow polypropylene composition comprising (A) a low molecular weight propylene homopolymer fraction and (B) a high molecular weight propylene copolymer fraction, having a comonomer content of not higher than 8 wt %, wherein the ratio between the $MFR_2$ of fraction (A) and the $MFR_2$ of fraction (B) is at least 3 and wherein the $MFR_2$ of the entire composition is at least 5 g/10 min, the values of $MFR_2$ being measured according to ISO 1133 (230° C., 2.16 kg load), and to processes for producing such compositions and to articles made there from.

17 Claims, 1 Drawing Sheet

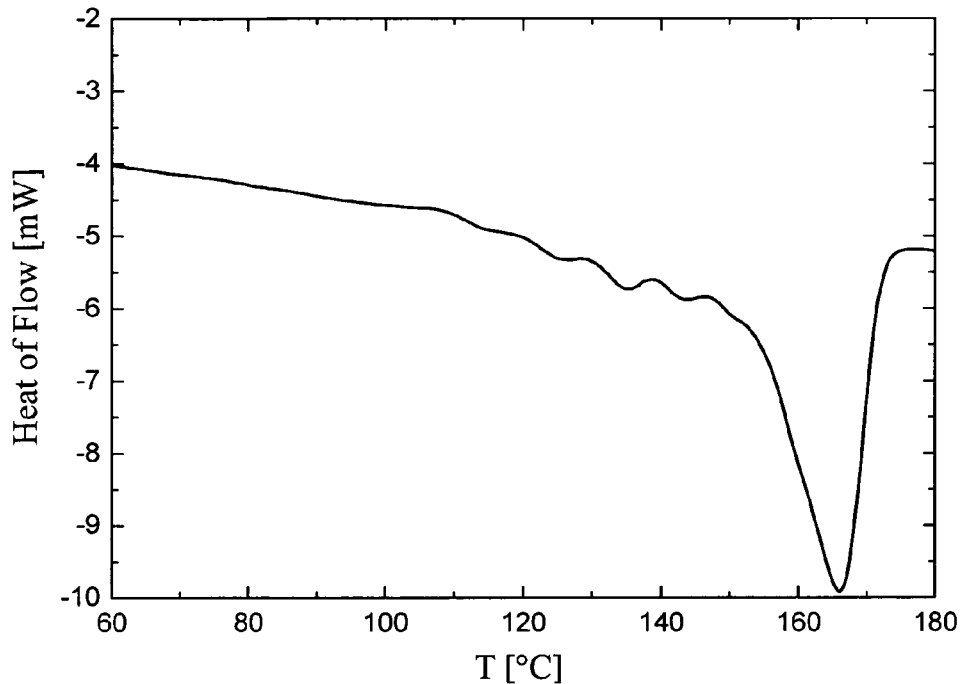
Figure 1: DSC endotherm from SIST technique for Example 2
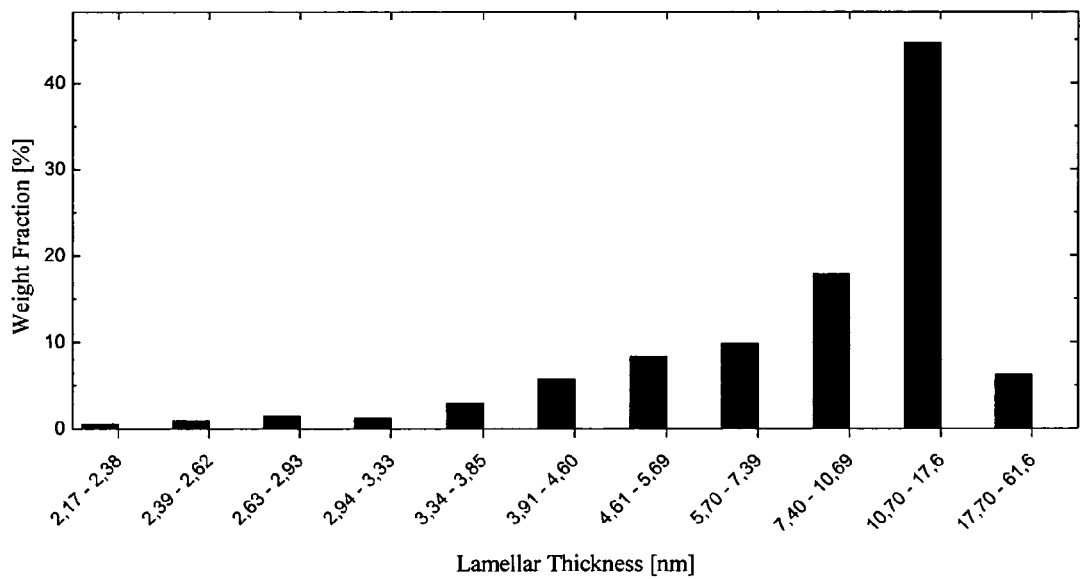
Figure 2: Lamellar thickness distribution from SIST technique for Example 2

HIGH FLOW POLYPROPYLENE COMPOSITION

The present invention relates to a polypropylene composition with a rather high melt flow rate, a high stiffness and an advantageous balance between stiffness and haze. Still further, the present invention is also directed to a process for producing the inventive polypropylene composition, to an article made of the inventive polypropylene composition and to the use of the inventive polypropylene composition for the production of moulded articles, particularly injection moulded articles, such as thin-walled plastic containers for packaging.

In the field of thin-wall packaging of the moulding market it is of great importance to have a well flowing material with good mechanical properties, i.e. a high tensile modulus and acceptable impact strength. The good flowability is needed for achieving a good processability in various manufacturing methods of articles, e.g. extrusion and moulding processes, thereby allowing the high production speed required in this mass production market. The mechanical properties are also critical in view of the thin-walled articles. Particularly, in the field of containers there is a need to hold the content such as food contained therein as well as having sufficient stiffness to be stacked. Finally, the materials should also withstand mechanical compression damage, which is frequently incurred by e.g. dropping the articles.

Still further, also the haze should be acceptable. Particularly, a good balance between stiffness and haze is desirable. However, at least some of these objects may only be achieved at the expense of other of these objects.

Generally speaking, a high degree of crystallinity of polypropylene compositions renders the material rather stiff, however also increases the haze. The crystallinity is influenced by the amount of comonomer contained in the propylene copolymer and by the molecular weight of the polymer chains, i.e. by the molecular weight distribution. A higher amount of comonomer means more interruption of the isotactic polypropylene units and hence less crystallinity. To a certain extent this entails improved optical properties, i.e. better haze values. However, the stiffness is reduced thereby. Hence, the balance of stiffness and haze is of great importance.

A rather low molecular weight improves processability and crystallinity, hence stiffness, however, the impact strength is deteriorated.

To solve said conflicts of aims EP 1 873 173 provides a polypropylene copolymer with a rather high melt flow rate value, namely an $MFR_2$ of 70 g/10 min or more. This means a rather low molecular weight which is achieved by the known method of visbreaking. During visbreaking the polypropylene chains received from the polymerization reactor are subjected to degradation by applying peroxide compounds. The result is that the polymer chains are cut statistically and a material with a higher MFR-value is received.

However, said materials may still be improved as regards their mechanical properties. Still further, materials subjected to visbreaking generally suffer from bad taste and odour which is a great disadvantage in the field of food packaging.

It is therefore an object of the present invention to provide a polypropylene composition with high flowability and hence processability, which at the same time has good mechanical and optical properties, particularly a good balance of stiffness and haze.

It has now surprisingly been found that the above objectives can be achieved by a particular polypropylene composition comprising (A) a low molecular weight propylene homopolymer fraction and
(B) a high molecular weight propylene copolymer fraction having a comonomer content of not higher than 8 wt % wherein the ratio between the $MFR_2$ of fraction (A) and the $MFR_2$ of fraction (B) is at least 3 and wherein the $MFR_2$ of the entire composition is at least 5 g/10 min, the values of $MFR_2$ being measured according to ISO 1133 (230° C., 2.16 kg load).

BRIEF DESCRIPTION OF THE DRAWINGS

FIG. 1 is a graph showing the melting curve for Example 2, which is a polypropylene composition produced by producing the base resin in two reactors connected in series.

FIG. 2 is a graph of the lamellar thickness distribution for Example 2.

DETAILED DESCRIPTION

Hence, the present invention provides a composition with a rather high melt flow rate, wherein the composition comprises at least two fractions with a rather different melt flow rate. There is no need for a step of visbreaking to achieve the desired high melt flow rate. The material according to the present invention apart from high flowability has an improved stiffness and acceptable impact properties.

Preferably, said ratio of $MFR_2$ is at least 25, still more preferably at least 40 and particularly preferred at least 50.

Said ratio of $MFR_2$ will usually be not higher than 800.

Preferably, the $MFR_2$ of the entire composition is at least 10 g/10 min, more preferably at least 18 g/10 min, more preferably at least 20 g/10 min, still more preferably at least 50 g/10 min.

Said value of $MFR_2$ will usually be not higher than 250 g/10 min. Preferably, said value of $MFR_2$ is lower than 70 g/10 min.

The high difference in melt flow rate of fractions (A) and (B) results in a broad molecular weight distribution of the composition. Said molecular weight distribution MWD is defined as the ratio between the weight average molecular weight $M_w$ and the number average molecular weight $M_n$. The MWD is measured by GPC as described further below.

Preferably, the MWD of the polypropylene composition is at least 3.5, more preferably at least 4.

Usually the MWD is not higher than 100.

The present invention provides a polypropylene composition with a rather high melt flow rate and a rather high ratio between the melt flow rates of fractions (A) and (B). It is not necessary to apply a step of visbreaking using peroxide compounds.

Hence, preferably, in the polypropylene composition according to the present invention the amount of peroxides or reaction products thereof is lower than 50 ppm, more preferably lower than 5 ppm. It is particularly preferred that no peroxide is detectable in the inventive polypropylene composition.

Fraction (B) of the polypropylene composition according to the present invention is a random propylene copolymer.

Preferably, the comonomer in copolymer fraction (B) is ethylene or a C4 to C10 alpha-olefin or any combination of these. Suitably comonomers are 1-butene, 1-pentene, 1-hexene, 1-octene, 4-methyl-1-pentene or 3-methyl-1-pentene. Still more preferably, the comonomer is ethylene.

The content of ethylene in the polypropylene composition according to the present invention is preferably at least 0.8 wt %, still more preferably at least 1.0 wt %.

The content of ethylene in the polypropylene composition according to the present invention is preferably not higher than 4.0 wt %, more preferably not higher than 3.2 wt %.

The content of ethylene in fraction (B) of the polypropylene composition according to the present invention is preferably at least 1.0 wt %, still more preferably at least 2.5 wt %.

The content of ethylene in fraction (B) of the polypropylene composition according to the present invention is preferably not higher than 6.5 wt %.

In case the comonomer in fraction (B) is not ethylene, the same preferred amounts of comonomer apply as discussed for ethylene above. In case a mixture of two or more comonomers is present in fraction (B), the same values apply for the sum of the amount of said comonomers.

The tensile modulus of the polypropylene composition according to the present invention is preferably at least 1500 MPa, still more preferably at least 1550 MPa and particularly preferred at least 1600 MPa.

The tensile modulus of the polypropylene composition according to the present invention is usually not higher than 3000 MPa.

The Charpy impact strength notched measured according to ISO 179 1eA of the polypropylene composition of the present invention at 23° C. is preferably in the range of 2.0 to 15.0 kJ/m$^2$.

The Charpy impact strength notched measured according to ISO 179 1eA of the polypropylene composition of the present invention at 0° C. is preferably in the range of 1.0 to 6.0 kJ/m$^2$.

The amount of xylene solubles XS of the polypropylene composition according to the present invention is preferably not higher than 7 wt %, more preferably not higher than 5 wt %, still more preferably not higher than 2.5 wt %.

The amount of xylene solubles XS of the polypropylene composition according to the present invention is usually at least 1 wt %.

Preferably, the melting temperature of the polypropylene composition according to the present invention is higher than 155° C.

The melting temperature will usually be not higher than 180° C.

Preferably, the crystallization temperature of the polypropylene composition according to the present invention is higher than 120° C.

The crystallization temperature will usually be not higher than 160° C.

The polypropylene composition according to the present invention is further specified by its lamellar thickness distribution. It has been recognized that higher thermal stability is achievable in case the polymer comprises at least a certain amount of thick crystal lamellae. The stepwise isothermal segregation technique (SIST) provides a possibility to determine the lamellar thickness distribution. Certain amounts of polymer fractions melting at rather high temperatures indicate the presence of thick lamellae, the respective correlation being provided by the well-known Gibbs-Thompson equation.

Therefore, the polypropylene composition according to the present invention preferably comprises at least 3.0 wt % of crystal lamellae having a thickness of at least 17.7 nm as determined by the SIST technique described further below.

The polypropylene composition according to the present invention comprises fraction (A), which is a low molecular weight fraction (LMW), and fraction (B), which is a high molecular weight fraction. The terms "high" and "low" do not define absolute values but denote the relationship between the two fractions as regards their molecular weight. Each of the two fractions has its own molecular weight distribution.

Preferably, the MFR$_2$ of fraction (A) is at least 40 g/10 min, more preferably at least 60 g/10 min, still more preferably at least 100 g/10 min and particularly preferred at least 200 g/10 min.

The MFR$_2$ of fraction (A) is usually not higher than 800 g/10 min.

Preferably, the MFR$_2$ of fraction (B) is not higher than 15 g/10 min, more preferably not higher than 12 g/10 min, still more preferably not higher than 6 g/10 min The MFR$_2$ of fraction (B) is usually at least 1.0 g/10 min.

Preferably, the melting temperature of fraction (A) is lower than 155° C.

The melting temperature of fraction (A) will usually be higher than 135° C.

The relative amount by weight of the two fractions (A) and (B) is usually in the range of 30:70 to 70:30, preferably 35:65 to 65:35.

The polypropylene composition according to the present invention may comprise further polyolefin fractions and may also contain non-polymeric additives.

The polymeric part of the polypropylene composition is denoted as base resin.

Preferably, the base resin consists of fractions (A) and (B).

Owing to the high difference in molecular weight of fractions (A) and (B) the base resin of the polypropylene composition has a multimodal, preferably a bimodal molecular weight distribution.

The expression "multimodal" used herein refers to the modality of the polymer, i.e. the form of its molecular weight distribution curve, which is the graph of the molecular weight fraction as a function of its molecular weight. As will be explained below, the base resin of the present invention can be produced in a sequential step process, using reactors in serial configuration and operating at different reaction conditions. As a consequence, each fraction prepared in a specific reactor will have its own molecular weight distribution. When the molecular weight distribution curves from these fractions are superimposed to obtain the molecular weight distribution curve of the final polymer, that curve may show two or more maxima or at least be distinctly broadened when compared with curves for the individual fractions. Such a polymer, produced in two or more serial steps, is called bimodal or multimodal, depending on the number of steps.

The base resin of the polypropylene composition according to the present invention is also multimodal or bimodal as regards the comonomer content, since it at least comprises a propylene homopolymer fraction and a propylene copolymer fraction.

The two fractions (A) and (B) and optionally further fractions may be produced in separate steps and mixed after polymerization by compounding.

Alternatively and preferably, the two fractions (A) and (B) and optionally further fractions are produced in a different reactor each, which reactors are connected in series, and each fraction is produced in the presence of the product of the preceding reactor(s) except for the first fraction.

In case the fractions are produced in reactors connected in series, the MFR$_2$-value of the product received from the first reactor may be measured directly. A product received from each of the following reactors is an intimate mixture of the products of the different reactors. Hence, the MFR$_2$-value can only be calculated based on measuring the MFR$_2$-values of the products received from the reactors and considering the weight ratio of the different fractions produced.

Preferably, fraction (A) is produced in a bulk reactor, which still more preferably is a loop reactor.

Preferably, fraction (B) is produced in a gas phase reactor.

Preferably, fraction (B) is produced after and in the presence of fraction (A).

The present invention also provides a process for the preparation of a polypropylene composition as defined above.

According to a first embodiment of the present invention, a process for preparing a high flow polypropylene composition is provided, comprising the following steps:
 (i) preparation of a low molecular weight propylene homopolymer with an $MFR_2$ of at least 40 g/10 min;
 (ii) preparation of a high molecular weight propylene copolymer with an $MFR_2$ of not more than 15 g/10 min and having a comonomer content of not higher than 8 wt %;
 and compounding the polymers to receive the final polypropylene composition having an $MFR_2$ of at least 5 g/10 min.

According to a second embodiment of the present invention, a process for preparing a high flow polypropylene composition is provided, comprising the following steps in any sequence:
 (i) preparation of a low molecular weight propylene homopolymer fraction with an $MFR_2$ of at least 100 g/10 min;
 (ii) preparation of a high molecular weight propylene copolymer fraction with an $MFR_2$ of not more than 10 g/10 min and having a comonomer content of not higher than 8 wt %;
 wherein the fractions are produced in different reactors connected in series and each fraction is produced in the presence of the product produced in the preceding reactor(s) except for the first fraction, resulting in the polypropylene composition having an $MFR_2$ of at least 10 g/10 min.

For both alternative embodiments of the inventive process the $MFR_2$ of the fraction produced in step i) will usually be not higher than 800 g/10 min.

Similarly, the $MFR_2$ of the fraction produced in step ii) will usually be not lower than 1.0 g/10 min.

Said value of $MFR_2$ of the resulting polypropylene composition will usually be not higher than 250 g/10 min.

Preferably, in the second embodiment, in addition as a first step a pre-polymerization of a propylene homopolymer fraction is carried out.

In the process a catalyst for the preparation of the polypropylene composition is applied. This catalyst can be any stereo-specific catalyst for propylene polymerisation, which preferably is capable of catalysing the polymerisation and copolymerisation of propylene and comonomers at a pressure of 500 to 10000 kPa, in particular 2500 to 8000 kPa, and at a temperature of 40 to 110° C., in particular of 60 to 110° C. Preferably, the catalyst comprises a high-yield Ziegler-Natta type catalyst, which can be used at high polymerisation temperatures of 80° C. or more.

One preferred catalyst to be used according to the invention is disclosed in EP 591 224 which discloses a method for preparing a pro-catalyst composition from magnesium dichloride, a titanium compound, a lower alcohol and an ester of phthalic acid containing at least five carbon atoms. According to EP 591 224, a trans-esterification reaction is carried out at an elevated temperature between the lower alcohol and the phthalic acid ester, whereby the ester groups from the lower alcohol and the phthalic ester change places.

Further preferred catalysts are metallocene catalysts.

Suitable external donors include dicyclo pentyl dimethoxy silane (donor D), cyclo hexyl methyl dimethoxy silane (donor C), diethylaminotriethoxysilane (donor U).

The Al/Do-ratio may vary to a great extent. The higher the ratio, the better the $H_2$-response thereby allowing producing polymers with higher values of $MFR_2$, hence having a higher flowability. The ratio is usually between 2 and 60 mol/mol.

In the second embodiment of the inventive process the catalyst is preferably present in the first polymerization step and is transferred together with the product to the second polymerization step.

Preferably, first the low molecular weight homopolymer fraction of propylene is produced and afterwards the high molecular weight copolymer fraction of propylene is produced in the presence of the already produced low molecular weight homopolymer fraction of propylene.

According to a particular preferred embodiment of the present invention, the polypropylene composition is prepared in a process according to the second embodiment of the inventive process, wherein the low molecular weight homopolymer fraction of propylene is prepared first in a loop reactor, optionally preceded by a step of pre-polymerization, followed by the preparation of the high molecular weight copolymer fraction of propylene in a gas phase reactor in the presence of the product received from the preceding step(s), using a Ziegler-Natta type catalyst. Still further, hydrogen gas is used as a chain transfer agent in the loop reactor to allow the high value of $MFR_2$ to be achieved, the reaction mixture from the loop reactor is fed directly to the gas phase reactor and no further hydrogen gas is added. The Al/Do-ratio is between 2 and 30 mol/mol.

In already indicated above, the polypropylene composition may comprise conventional adjuvants, such as additives, fillers and reinforcing agents or additional impact modifiers.

The following are optional additives: nucleating agents, process and heat stabilisers, pigments and other colouring agents including carbon black. Depending on the type of additive, these may be added in an amount of 0.001 to 10 wt %, based on the weight of the polymer composition.

In a preferred embodiment, the polymer composition includes 0.05 to 3 wt % based on the weight of the polymer composition, of one or more alpha-nucleating agents such as talc, polymerised vinyl compounds such as polyvinylcyclohexane (PVCH), dibenzylidene sorbitol, sodium benzoate, and di(alkylbenzylidene)sorbitol or mixtures thereof. The alpha-nucleating agent is usually added in small amounts of 0.0001 to 1 wt %, more preferably 0.001 to 0.7 wt %. Since talc can act both as a nucleating agent and as filler, it can be added in higher amounts. When added as a nucleating agent, talc is preferably added in an amount of 0.05 to 3 wt %, more preferably 0.1 to 2 wt %, still more preferably less than 1 wt %, based on the weight of the polymer composition. Further details about these nucleating agents can be found e.g. in WO 99/24479 and WO 99/24501.

Further preferred additives which may be added to the inventive compositions include: antioxidants, antistatic agents, slip agents, UV stabilisers, acid scavengers. Also fillers may be added to the compositions. Any filler known in the art may be used, depending on the desired properties. Mica and talc are examples of conventionally used fillers.

In the preferred embodiments, the additives are added to the base resin, which is collected from the final reactor of the series of reactors, to generate the polypropylene composition of the invention. Preferably, these additives are mixed into the composition prior to or during the extrusion process in a one-step compounding process. Alternatively, a master batch may be formulated, wherein the base resin is first mixed with only some of the additives.

For mixing, a conventional compounding or blending apparatus, e.g. a Banbury mixer, a 2-roll rubber mill, Bussco-kneader or a twin screw extruder may be used. The twin screw extruder may be co-rotating or counter-rotating, preferably co-rotating. Preferably, the composition will be prepared by blending the additives together with the polymeric material at a temperature, which is sufficiently high to soften and plasticize the polymer. The temperatures and pressures used in the operation of the extruder are known in the art. Typically the temperature may be selected from the range of 150 to 350° C. The pressure used for extrusion preferably is 50 to 500 bar. The polymer materials recovered from the extruder are usually in the form of pellets. These pellets are then preferably further processed, e.g. by injection moulding to generate articles and products of the inventive compositions.

The compositions of the current invention are preferably used for the production of films and moulded articles, preferably injection moulded articles. Even more preferred is the use for the production of thin-walled containers and packaging articles, preferably plastic cups or other house-wares.

The current invention also provides articles comprising the inventive polypropylene composition. Preferably, these articles are produced by injection moulding.

Measurement Methods a) Molecular Weight

The weight average molecular weight $M_w$ and the molecular weight distribution (MWD=$M_w/M_n$ wherein $M_n$ is the number average molecular weight and $M_w$ is the weight average molecular weight) is measured by a method based on ISO 16014-4:2003. A Waters 150CV plus instrument was used with column 3×HT&E styragel from Waters (divinylbenzene) and trichlorobenzene (TCB) as solvent at 140° C. The column set was calibrated using universal calibration with narrow MWD PS standards (the Mark-Houwink constant K: 9.54*$10^{-5}$ and a: 0.725 for PS, and K: 1.91*$10^{-4}$ and a: 0.725 for PP). The ratio of $M_w$ and $M_n$ is a measure of the broadness of the distribution, since each is influenced by the opposite end of the "population".

b) Melt Flow Rate

The melt flow rate is measured as the $MFR_2$ in accordance with ISO 1133 (230° C., 2.16 kg load) for polypropylene and is indicated in g/10 min. The MFR is an indication of the flowability, and hence the processability, of the polymer. The higher the melt flow rate, the lower the viscosity of the polymer.

The $MFR_2$ of a fraction (B) produced in the presence of a fraction (A) is calculated using the measured values of $MFR_2$ of fraction (A) and the mixture received after producing fraction (B) ("final"):

$$\frac{1}{(\log_{10} MFR_2 (\text{final}))} = \frac{\text{weight fraction}(A)}{(\log_{10} MFR_2 (A))} + \frac{\text{weight fraction}(B)}{(\log_{10} MFR_2 (B))}$$

c) Xylene Solubles

The xylene soluble fraction (XS) as defined and described in the present invention is determined as follows: 2.0 g of the polymer are dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (wt %) can then be determined as follows:

$$XS = (100 \times m_1 \times V_0)/(m_0 \times V_1),$$

wherein $m_0$ designates the initial polymer amount (g), $m_1$ defines the weight of residue (g), $V_0$ defines the initial volume (ml) and $V_1$ defines the volume of the analyzed sample (ml).

d) Comonomer Content

Quantitative Fourier transform infrared (FTIR) spectroscopy was used to quantify the amount of comonomer. Calibration was achieved by correlation to comonomer contents determined by quantitative nuclear magnetic resonance (NMR) spectroscopy.

The calibration procedure based on results obtained from quantitative $^{13}$C-NMR spectroscopy was undertaken in the conventional manner well documented in the literature.

The amount of comonomer (N) was determined as weight percent (wt %) via:

$$N = k1(A/R) + k2$$

wherein A is the maximum absorbance defined of the comonomer band, R the maximum absorbance defined as peak height of the reference peak and with k1 and k2 the linear constants obtained by calibration. The band used for ethylene content quantification is selected depending if the ethylene content is random (730 cm$^{-1}$) or block-like (720 cm$^{-1}$). The absorbance at 4324 cm$^{-1}$ was used as a reference band.

e) Melting Temperature, Crystallization Temperature

The melting temperature $T_m$, crystallisation temperature $T_c$ and degree of crystallinity are measured with a Mettler TA820 differential scanning calorimetry device (DSC) on 3±0.5 mg samples. Crystallisation and melting temperatures are obtained during 10° C./min cooling and heating scans between 30° C. and 225° C. Melting and crystallisation temperatures were taken as the peaks of the endotherms and exotherms. The degree of crystallinity is calculated by comparison with the heat or fusion of a perfectly crystalline polypropylene, i.e. 209 J/g.

f) Stepwise Isothermal Segregation Technique (SIST)

The isothermal crystallisation for SIST analysis was performed in a Mettler TA820 DSC on 3±0.5 mg samples at decreasing temperatures between 200° C. and 105° C. as also described in Journal of Applied Polymer Science, Vol. 95, 1073-1081 (2005):

(i) The samples were melted at 225° C. for 5 min,
(ii) then cooled with 80° C./min to 145° C.,
(iii) held for 2 hours at 145° C.,
(iv) then cooled with 80° C./min to 135° C.,
(v) held for 2 hours at 135° C.,
(vi) then cooled with 80° C./min to 125° C.,
(vii) held for 2 hours at 125° C.,
(viii) then cooled with 80° C./min to 115° C.,
(ix) held for 2 hours at 115° C.,
(x) then cooled with 80° C./min to 105° C., and
(xi) held for 2 hours at 105° C.

After the last step the sample was cooled down to ambient temperature, and the melting curve (see FIG. 1) was obtained by heating the cooled sample at a heating rate of 10° C./min up to 200° C.

All measurements were performed in a nitrogen atmosphere. The melt enthalpy is recorded as a function of temperature and evaluated through measuring the melt enthalpy of fractions melting within temperature intervals.

The melting curve of the material crystallised this way can be used for calculating the lamella thickness distribution (see FIG. 2) according to the Gibbs-Thomson equation:

$$T_m = T_0\left(1 - \frac{2\sigma}{\Delta H_0 \cdot L}\right)$$

where $T_0=457$ K, $\Delta H_0=184\cdot 10^6$ J/m$^3$, $\sigma=0.049$ J/m$^2$ and L is the lamella thickness.

The melt enthalpy [J/g] of each fraction of the polymer sample as defined above is obtained as follows: In general the melt enthalpy is calculated from the quotient of the heat flow volume and initial weight of the sample. The heat flow volume is recorded as function of temperature, i.e. the melting curve. The area above each minimum (includes also shoulders) of the melting curve represents its melt enthalpy. The integration limits for each area to be calculated are defined by relative maxima (includes also shoulders) and by the intersection points of the base line with the melting curve, in the direct neighbourhood of each minimum of the melting curve.

The maxima, minima, shoulders of the melting curve as well as the areas are determined as known from DSC-curves. Accordingly the relative maxima may be mathematically understood, i.e. a point x* is a relative maximum of a function $f$ if there exists some $\epsilon>0$ such that $f(x^*) \geq f(x)$ for all x with $|x-x^*|<\epsilon$. Furthermore, in case of shoulders, the first derivative of the function (the measured melting curve) must lead to a relative maximum at the relative maximum of said function. Excluded are those inflection points that are located between two relative extrema.

g) Charpy Notched Impact Strength

Charpy notched impact is measured according to ISO 179/1eA at +23° C. and at 0° C. using an injection moulded test specimen as described in EN ISO 1873-2 (80×10×4 mm).

h) Tensile Strength, Tensile Modulus

The tensile strength, including tensile stress at yield and strain at yield, is measured according to ISO 572-2 (cross head speed 50 mm/min). The tensile modulus is measured according to ISO 572-2 (cross head speed 1 mm/min) using injection molded specimens as described in EN ISO 1873-2 (dog bone shape, 4 mm thickness).

i) Haze

Haze and transparency are determined from 1 mm or 2 mm injection molded plaque samples according to ASTM D 1003.

EXAMPLES

Three polypropylene compositions according to the present invention have been produced, one of which by compounding of two polyolefin fractions (Example 1), and two of which by producing the base resin in two reactors connected in series (Examples 2 and 3).

Still further, four comparative compositions have been produced. One of said compositions is the result of compounding (Comparative Example 1). The remainders have been produced in two reactors connected in series (Comparative Examples 2, 3 and 4).

The composition of Example 2 has been produced in a two-step polymerization process starting in a bulk-phase loop reactor followed by polymerization in a gas phase reactor, varying the molecular weight and ethylene content by appropriate hydrogen and comonomer feeds. The catalyst used in the polymerization process was the commercial BCF20P catalyst (1.9 wt % Ti-Ziegler-Natta-catalyst as described in EP 591 224) of Borealis with triethyl-aluminium (TEA) as co-catalyst and dicyclo pentyl dimethoxy silane as donor. The aluminium to donor ratio was 15 mol/mol.

For Example 1 and Comparative Example 1 the two polyolefin fractions produced in the same manner as the composition of Example 2, but without a differentiation of the molecular weight of the fractions produced, have been compounded in a co-rotating twin-screw extruder at 200-230° C.

The composition of Example 3 has been produced in a two-step polymerization process starting in a bulk-phase loop reactor followed by polymerization in a gas phase reactor, varying the molecular weight and ethylene content by appropriate hydrogen and comonomer feeds. The catalyst used in the polymerization process was the commercial BCF20P catalyst (1.9 wt Ti-Ziegler-Natta-catalyst as described in EP 591 224) of Borealis with triethyl-aluminium (TEA) as co-catalyst and dicyclo pentyl dimethoxy silane as donor. The aluminium to donor ratio was 5 mol/mol.

Before the polymerization, the catalyst was prepolymerized with vinyl cyclohexane in an amount to achieve a concentration of 200 ppm poly(vinyl cyclohexane) (PVCH) in the final polymer. The respective process is described in EP 1 028 984 and EP 1 183 307.

The composition of Comparative Example 2 has been produced in the same manner as the composition of Example 2, using identical catalyst and donor type but without a differentiation of the molecular weight of the fractions produced.

The compositions of Comparative Examples 3 and 4 have been produced in the same manner as Example 3, using identical catalyst and donor type.

The composition of Example 1 contained 600 ppm of Irganox B 225 (supplied by Ciba Speciality Chemicals, a blend of 50% Irganox 1010, Pentaerythrityl-tetrakis(3-(3',5'-di-tert. butyl-4-hydroxyphenyl)-propionate, CAS-no. 6683-19-8 and 50% Irgafos 168, Tris (2,4-di-t-butylphenyl) phosphate, CAS-no. 31570-04-4), 700 ppm of calcium stearate (supplied by Croda Polymer Additives, CAS-no. 1592-23-0), 1500 ppm GMS 40 (supplied by Croda Polymer Additives, glycerol ester of stearic acid, CAS-no. 97593-29-8), 500 ppm talc Tital 10 (supplied by Ankerpoort Minerals) and 900 ppm Millad 3988 (supplied by Milliken Inc., 1,3:2,4 Bis(3,4-dimethylbenzylidene)sorbitol, CAS-no. 135861-56-2).

The composition of Example 2 contained 2000 ppm of Irganox B 225 (supplied by Ciba Speciality Chemicals, a blend of 50% Irganox 1010, Pentaerythrityl-tetrakis(3-(3',5'-di-tert. butyl-4-hydroxyphenyl)-propionate, CAS-no. 6683-19-8 and 50% Irgafos 168, Tris (2,4-di-t-butylphenyl) phosphate, CAS-no. 31570-04-4), 1000 ppm of calcium stearate (supplied by Croda Polymer Additives, CAS-no. 1592-23-0) and 2000 ppm Millad 3988 (supplied by Milliken Inc., 1,3:2,4 Bis(3,4-dimethylbenzylidene)sorbitol, CAS-no. 135861-56-2).

The compositions of Example 3 and of Comparative Examples 3 and 4 contained 2000 ppm of Irganox B 225 (supplied by Ciba Speciality Chemicals, a blend of 50% Irganox 1010, Pentaerythrityl-tetrakis(3-(3',5'-di-tert. butyl-4-hydroxyphenyl)-propionate, CAS-no. 6683-19-8 and 50% Irgafos 168, Tris (2,4-di-t-butylphenyl) phosphate, CAS-no. 31570-04-4) and 500 ppm of calcium stearate (supplied by Croda Polymer Additives, CAS-no. 1592-23-0) each.

The composition of Comparative Example 1 contained 600 ppm of Irganox B 225 (supplied by Ciba Speciality Chemicals, a blend of 50% Irganox 1010, Pentaerythrityl-tetrakis (3-(3',5'-di-tert. butyl-4-hydroxyphenyl)-propionate, CAS-no. 6683-19-8 and 50% Irgafos 168, Tris (2,4-di-t-butylphenyl)phosphate, CAS-no. 31570-04-4), 350 ppm calcium stearate (supplied by Croda Polymer Additives, CAS-no. 1592-23-0), 1000 ppm GMS 40 (supplied by Croda Polymer Additives, glycerol ester of stearic acid, CAS-no. 97593-29-8) and 1500 ppm Millad 3988 (supplied by Milliken Inc., 1,3:2,4 Bis(3,4-dimethylbenzylidene)sorbitol, CAS-no. 135861-56-2).

The composition of Comparative Example 2 contained 1000 ppm of Irganox B 225 (supplied by Ciba Specialty Chemicals, a blend of 50% Irganox 1010, Pentaerythrityl-tetrakis(3-(3',5'-di-tert. butyl-4-hydroxyphenyl)-propionate, CAS-no. 6683-19-8 and 50% Irgafos 168, Tris (2,4-di-t-butylphenyl)phosphate, CAS-no. 31570-04-4), 900 ppm calcium stearate (supplied by Croda Polymer Additives, CAS-no. 1592-23-0), 1400 ppm GMS 40 (supplied by Croda Polymer Additives, glycerol ester of stearic acid, CAS-no. 97593-29-8) and 1700 ppm Millad 3988 (supplied by Milliken Inc., 1,3:2,4 Bis(3,4-dimethylbenzylidene)sorbitol, CAS-no. 135861-56-2).

Table 1 shows the properties defining the compositions of Examples 1 to 3. Table 2 shows the corresponding values for Comparative Examples 1 to 4.

Table 3 shows mechanical and optical properties of the compositions of Examples 1 to 3. Table 4 shows the corresponding values for Comparative Examples 1 to 4. All characterizations and measurements in these tables were performed on the compositions including the additives listed above, said additives being mixed into the polymers in a co-rotating twin-screw extruder at 200-230° C.

What can be seen from Tables 3 and 4 is that the inventive composition of Example 1 shows a higher tensile modulus than the composition of Comparative Example 1 and at the same time has acceptable values of haze and impact strength. It is noted that in the composition of Comparative Example 1 the low molecular weight fraction is a propylene copolymer whereas the high molecular weight fraction is a propylene homopolymer.

Similarly, Examples 2 and 3 show a higher tensile modulus and at the same time have acceptable values of haze and impact strength. The compositions of Comparative Examples 3 and 4 comprise two copolymer fractions. The $MFR_2$ of the two fractions of Comparative Example 3 is nearly the same.

TABLE 1

|  | Example 1 | Example 2 | Example 3 |
|---|---|---|---|
| Fraction (A) |  |  |  |
| $MFR_2$/g/10 min | 50 | 302 | 139 |
| Ethylene content/wt % | 0 | 0 | 0 |
| Xylene solubles/wt % | 2.2 | 2.0 | 1.7 |
| Split/wt % | 49 | 61.2 | 49 |
| Fraction (B) |  |  |  |
| $MFR_2$/g/10 min | 12 | 4.7 | 4.7 |
| Ethylene content/wt % | 3.9 | 4.9 | 2.7 |
| Xylene solubles/wt % | 5.5 | 2.7 | 2.7 |
| Split/wt % | 51 | 38.8 | 51 |
| Final composition |  |  |  |
| $MFR_2$/g/10 min | 23 | 60 | 18 |
| MFR-ratio | 4.2 | 64.3 | 29.6 |
| Ethylene content/wt % | 2.0 | 1.9 | 1.4 |
| Xylene solubles/wt % | 3.8 | 2.2 | 2.2 |
| $T_m$/° C. | 162 | 162 | 162 |
| $T_c$/° C. | 128 | 129 | 126 |
| SIST fraction > 17.7 nm/wt % | 7.5 | 6.5 | 9.5 |

TABLE 2

|  | Comp. Ex. 1 | Comp. Ex. 2 | Comp. Ex. 3 | Comp. Ex. 4 |
|---|---|---|---|---|
| Fraction (A) |  |  |  |  |
| $MFR_2$/g/10 min | 4.0 | 70 | 21 | 101 |
| Ethylene content/wt % | 0 | 2.7 | 1.2 | 1.9 |
| Xylene solubles/wt % | 3.0 | 5.0 | — | — |
| Split/wt % | 26 | 100 | 50 | 50 |
| Fraction (B) |  |  |  |  |
| $MFR_2$/g/10 min | 70 | — | 19 | 3.6 |
| Ethylene content/wt % | 2.7 | — | 2.8 | 1.3 |
| Xylene solubles/wt % | 5.0 | — | — | — |
| Split/wt % | 74 | — | 50 | 50 |
| Final composition |  |  |  |  |
| $MFR_2$/g/10 min | 33 | 70 | 20 | 19 |
| MFR-ratio | 0.06 | — | 1.11 | 28.1 |
| Ethylene content/wt % | 2.0 | 2.7 | 2.0 | 1.6 |
| Xylene solubles/wt % | 4.5 | 5.0 | 2.2 | 2.9 |
| $T_m$/° C. | 155 | 152 | 154 | 161 |
| $T_c$/° C. | 126 | 121 | 122 | 126 |
| SIST fraction > 17.7 nm/wt % | — | — | 0.0 | 0.0 |

TABLE 3

|  | Example 1 | Example 2 | Example 3 |
|---|---|---|---|
| $MFR_2$/g/10 min | 23 | 60 | 18 |
| MFR-ratio | 4.2 | 64.3 | 29.6 |
| Ethylene content/wt % | 2.0 | 1.9 | 1.4 |
| Xylene solubles/wt % | 3.8 | 2.2 | 2.2 |
| SIST fraction > 17.7 nm/wt % | 7.5 | 6.5 | 9.5 |
| Tensile Modulus/MPa | 1630 | 1681 | 1630 |
| Charpy/kJ/$m^2$, 23° C. | 4.2 | 2.3 | 5.1 |
| Charpy/kJ/$m^2$, 0° C. | 1.6 | 1.1 | 1.8 |
| Haze/%, 1 mm plaques | 17 | 34 | 32 |
| Haze/%, 2 mm plaques | 44 | 53 | 64 |

TABLE 4

|  | Comp. Ex. 1 | Comp. Ex. 2 | Comp. Ex. 3 | Comp. Ex. 4 |
|---|---|---|---|---|
| $MFR_2$/g/10 min | 33 | 70 | 20 | 19 |
| MFR-ratio | 0.06 | — | 1.11 | 28.1 |
| Ethylene content/wt % | 2.0 | 2.7 | 2.0 | 1.6 |
| Xylene solubles/wt % | 4.5 | 5.0 | 2.2 | 2.9 |
| SIST fraction > 17.7 nm/wt % | — | — | 0.0 | 0.0 |
| Tensile Modulus/MPa | 1490 | 1200 | 1330 | 1450 |
| Charpy/kJ/$m^2$, 23° C. | 3.7 | 5.5 | 5.6 | 5.0 |
| Charpy/kJ/$m^2$, 0° C. | 1.6 | 1.5 | 1.6 | 1.8 |
| Haze/%, 1 mm plaques | 32 | 20 | 29 | 32 |
| Haze/%, 2 mm plaques | 30 | 42 | 57 | 63 |

The invention claimed is:

1. A polypropylene composition comprising
   (A) a low molecular weight propylene homopolymer fraction and
   (B) a high molecular weight propylene copolymer fraction, having a comonomer content of not higher than 8 wt%, wherein the ratio between the $MFR_2$ of fraction (A) and the $MFR_2$ of fraction (B) is at least 3; the $MFR_2$ of fraction (B) is not higher than 15 g/10 min and the $MFR_2$ of the entire composition is at least 50 g/10 min, the values of $MFR_2$ being measured according to ISO 1133 (230 ° C., 2.16 kg load).

2. The polypropylene composition according to claim 1, wherein said $MFR_2$ ratio is at least 25.

3. The polypropylene composition according to claim 1, wherein the amount of peroxides or reaction products thereof is lower than 50 ppm.

4. The polypropylene composition according to claim 1, wherein the MFR$_2$ of fraction (A) is at least 40 g/10 min.

5. The polypropylene composition according to claim 1, wherein the comonomer in the copolymer fraction (B) is ethylene or a C4 to C10 alpha-olefin or any combination of these.

6. The polypropylene composition according to claim 5, wherein the comonomer is ethylene.

7. The polypropylene composition according to claim 5, wherein the content of comonomer in the composition is between 0.8 and 4.0 wt %.

8. The polypropylene composition according to claim 1, wherein the tensile modulus measured according to ISO 572-2 is at least 1500 MPa.

9. The polypropylene composition according to claim 1 comprising at least 3.0 wt % of crystal lamellae having a thickness of at least 17.7 nm as measured by stepwise isothermal segregation.

10. A process for preparing a high flow polypropylene composition, comprising the following steps:
 (i) preparation of a low molecular weight propylene homopolymer with an MFR$_2$ of at least 40 g/10 min;
 (ii) preparation of a high molecular weight propylene copolymer with an MFR$_2$ of not more than 15 g/10 min and having a comonomer content of not higher than 8 wt %;
 and compounding the polymers to receive the final polypropylene composition having an MFR$_2$ of at least 50 g/10 min.

11. A process for preparing a high flow polypropylene composition, comprising the following steps in any sequence:
 (i) preparation of a low molecular weight propylene homopolymer fraction with an MFR$_2$ of at least 100 g/10 min;
 (ii) preparation of a high molecular weight propylene copolymer fraction with an MFR$_2$ of not more than 10 g/10 min and having a comonomer content of not higher than 8 wt %;
 wherein the fractions are produced in different reactors connected in series and each fraction is produced in the presence of the product produced in the preceding reactor(s) except for the first fraction, resulting in the polypropylene composition having an MFR$_2$ of at least 50 g/10 min.

12. An article comprising a polypropylene composition according to claim 1.

13. The polypropylene composition according to claim 1, wherein the polypropylene composition comprises at least 6.5 wt % of crystal lamellae having a thickness of at least 17.7 nm as measured by stepwise isothermal segregation.

14. The polypropylene composition according to claim 1, wherein the polypropylene composition comprises at least 7.5 wt % of crystal lamellae having a thickness of at least 17.7 nm as measured by stepwise isothermal segregation.

15. The polypropylene composition according to claim 1, wherein the polypropylene composition comprises at least 9.5 wt % of crystal lamellae having a thickness of at least 17.7 nm as measured by stepwise isothermal segregation.

16. The polypropylene composition according to claim 1, wherein the MFR$_2$ of the entire composition is at least 60 g/10 min.

17. The polypropylene composition according to claim 1, wherein the MFR$_2$ of fraction (A) is at least 200 g/10 min.

* * * * *